United States Patent
LaRocco

(10) Patent No.: US 11,247,618 B2
(45) Date of Patent: *Feb. 15, 2022

(54) RV SUBFLOOR AND SLIDE OUT HEAT REFLECTIVE FILM AND RELATED METHOD

(71) Applicant: Michael C. LaRocco, Sewickley, PA (US)

(72) Inventor: Michael C. LaRocco, Sewickley, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,079

(22) Filed: Apr. 3, 2020

(65) Prior Publication Data
US 2021/0053510 A1 Feb. 25, 2021

Related U.S. Application Data

(63) Continuation-in-part of application No. 16/297,541, filed on Mar. 8, 2019, now Pat. No. 10,875,476.

(51) Int. Cl.
| | |
|---|---|
| *B60R 13/08* | (2006.01) |
| *B60P 3/34* | (2006.01) |
| *B32B 5/18* | (2006.01) |
| *B32B 5/24* | (2006.01) |
| *B32B 27/12* | (2006.01) |
| *B32B 27/06* | (2006.01) |
| *B32B 27/40* | (2006.01) |
| *B32B 27/36* | (2006.01) |
| *B32B 27/32* | (2006.01) |
| *B32B 5/02* | (2006.01) |

(52) U.S. Cl.
CPC ............ *B60R 13/083* (2013.01); *B32B 5/028* (2013.01); *B32B 5/18* (2013.01); *B32B 5/245* (2013.01); *B32B 27/065* (2013.01); *B32B 27/12* (2013.01); *B32B 27/32* (2013.01); *B32B 27/36* (2013.01); *B32B 27/40* (2013.01); *B60P 3/34* (2013.01); *B32B 2250/05* (2013.01); *B32B 2255/10* (2013.01); *B32B 2255/205* (2013.01); *B32B 2262/0284* (2013.01); *B32B 2266/0278* (2013.01); *B32B 2307/304* (2013.01); *B32B 2605/00* (2013.01)

(58) Field of Classification Search
CPC .... B62D 53/06; B62D 33/048; B62D 29/002; B62D 25/10; B60P 3/20; B60P 3/34; B60R 13/083
USPC .......... 296/24.35, 181.6, 184.1, 185.1, 186.1
See application file for complete search history.

(56) References Cited

U.S. PATENT DOCUMENTS

| | | | |
|---|---|---|---|
| 10,875,476 B2 * | 12/2020 | LaRocco | ................ B32B 5/028 |
| 2008/0203761 A1 * | 8/2008 | Smith | ...................... B60P 3/36 |
| | | | 296/156 |

* cited by examiner

*Primary Examiner* — Dennis H Pedder
(74) *Attorney, Agent, or Firm* — Gary P. Topolosky

(57) ABSTRACT

A thermal radiation shield for the floors of an RV unit, and for the various floor, ceiling, sidewalls of a slide out for said RV unit. The shield includes a low-emissivity, heat reflecting film that includes a metal coating layer, preferably vapor deposited, further protected by a layer of durable PET film.

19 Claims, 4 Drawing Sheets

RV SUBFLOOR AND SLIDE OUT HEAT REFLECTIVE FILM AND RELATED METHOD

CROSS-REFERENCE TO RELATED APPLICATIONS

This application is a continuation-in-part from U.S. application Ser. No. 16/297,541, filed on Mar. 8, 2019, which was a perfection of U.S. Provisional Ser. No. 62/640,124, filed on Mar. 8, 2018, both disclosures of which are fully incorporated herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

This invention relates to recreational vehicles or RV's. More particularly, it relates to structural improvements to the sub-floors of such vehicles (whether self driving or towed behind as a trailer) and to all walls, floors and ceilings of the slide out additions to such RV models to improve their high temperature thermal resistance and/or interior temperature control either while on the road or when stopped for any length of time.

It is known the extent to which RV's on the road experience increasingly high temperatures radiating upward from a hot asphalt road and/or parking surface. Much of this heat (as infrared heat) transfers upwardly to the underside of the vehicle where such heat negatively impacts the cooling temperatures inside and requires additional cooling procedures to compensate for these radiated heat "losses". With the current systems (before this invention), thermal radiation from the roadways and parking surfaces penetrate the RV floor as best seen in accompanying FIG. 2—Prior Art. This invention proposes to solve that "problem" with the addition of a new low-emissivity (or "Low-E") heat reflecting film for reflecting roadway thermal radiation away from the RV undersides especially. One preferred version entails adding to an existing RV, or when building one anew, including a thermal heat reflection layer with a Low-E coating under a durable PET film to the RV's underside. Additionally, a variation of this same heat reflective material may be incorporated into the floors, walls and roofs of RV slide outs for further heat performance improvements.

(2) Description of Related Art Including Information Disclosed Under 37 CFR 1.97 and 1.98

Relevant Art—Numerous references address various aspects of reefer units and/or trailer transportation devices. They include, but are not limited to, U.S. Pat. Nos. 9,694,897 and 5,170,605 along with U.S. Published Application Nos. 20140147642, 2014144161 and 20140127451. There is also relevant, but clearly distinguishable teachings in WO19990140372, RU114073, JP2010076799, CN101415599 and DE102013102039.

None of the foregoing teach or suggest any changes to an existing RV unit sub-floor, or to a newly constructed floor for the same, to impart significant heat reflectivity to the undercarriage of such units (from the direction of the ground/highway, or floor in general). What is desired is a means for creating a radiant barrier layer insulating the undersides of an RV to such high heat exposures. Ideally, this invention may provide significant heat reductions to the sub-floors of such units either through their use as a substitute for various sub-floor components in a new construction OR as an after market, "add on" layering or supplemental addition to the sub-floors of an existing RV unit.

BRIEF SUMMARY OF THE INVENTION

This invention offers a thermal radiation subpan shield for RV units, both towable and self-driven. It provides a new Low-E, heat reflecting film (or coated film product) that will be cooler, lighter yet stronger than the current sub-flooring that it replaces. It will have NO pinholes there through. With such a glass-reinforced layer, this invention will provide: (a) composite durability; (b) proven corrosion resistance AND (c) a heat reflective layer contained within a composite film.

This invention will offer a weight savings with improved aesthetics and consistency. Preliminary laboratory heat gain testing has been observed for other applications.

One version uses a glass-reinforced bi-directional thermoplastic panel that provides composite durability, naturally proven corrosion resistance yet with a reflective layer contained with (or incorporated in) a composite layer therefor.

Another variation employs a polyester PET surface film as a replacement for PP film in an RV trailer's floor construction. PET is a higher temperature film that will not melt in lamination. PET is 100% closed as a film with NO pinholes. It is also a harder surface, more scratch resistant than its PP counterpart.

Ideally, this invention, as a composite nonwoven, includes a vapor deposited aluminum coating to give the opacity and heat reflecting capability that traps the metallized layer beneath this PET surface layer. The surface itself will be film bonded with a composite fiber, non-woven backing.

BRIEF DESCRIPTION OF THE DRAWING(S)

Further features, objectives and advantages of this invention will be made clearer with the following Detailed Description made with reference to the accompanying Figures in which.

Figure 1:
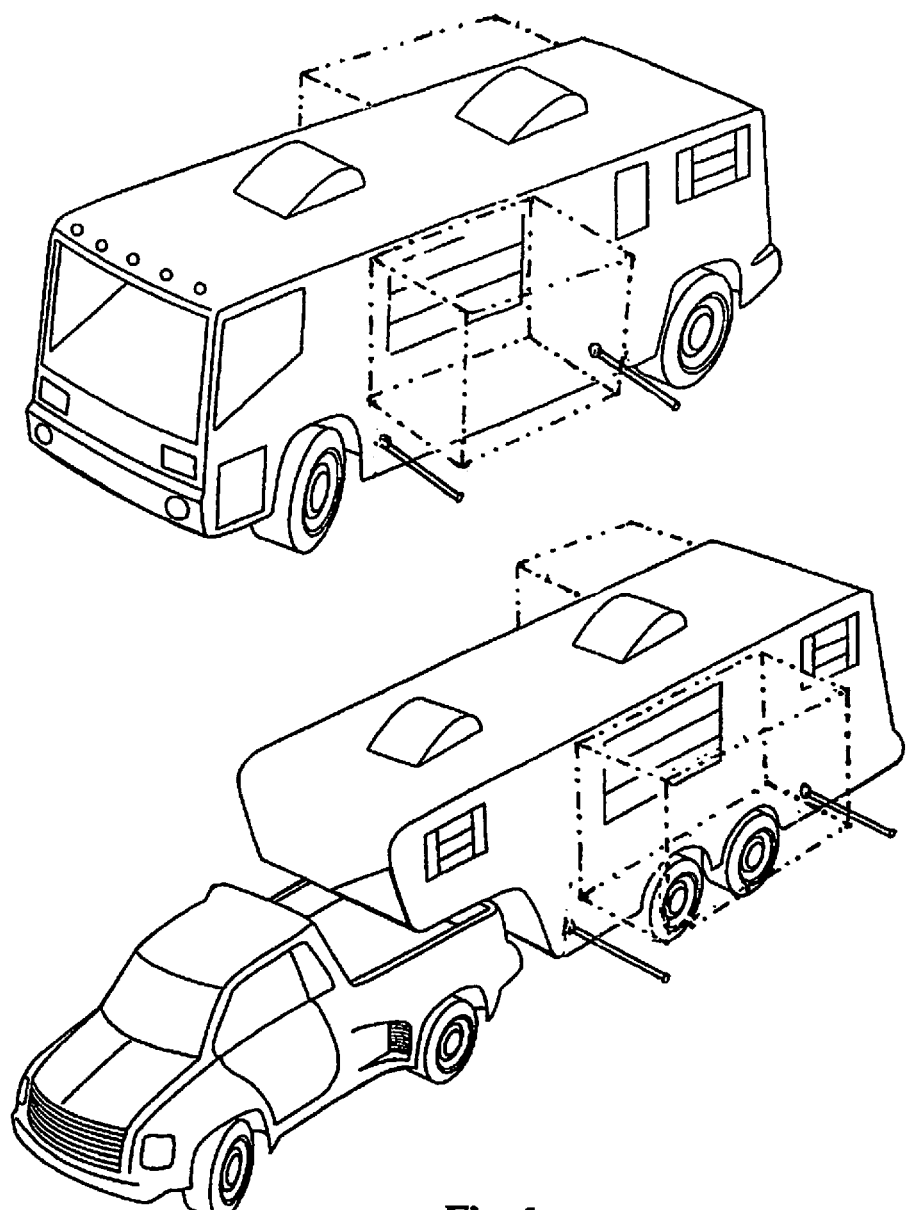
FIG. 1 are top perspective views of typical or representative RV units, the upper version being a self-propelled, fully contained model (with slide outs shown in dotted lines from both sidewalls) with a truck-pulled RV trailer unit type below (also with its dual slide outs shown in dotted lines from both sidewalls)
Figure 2:
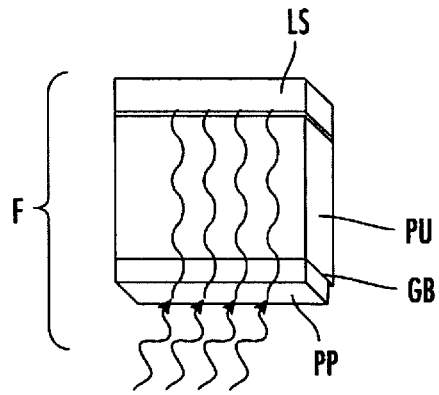
FIG. 2 is a side schematic view of the typical prior art RV floor with arrows depicting how thermal radiation from the roadway and/or parking surface beneath floor F penetrates that floor and enters the RV interior through loading surface LS.
Figure 3:
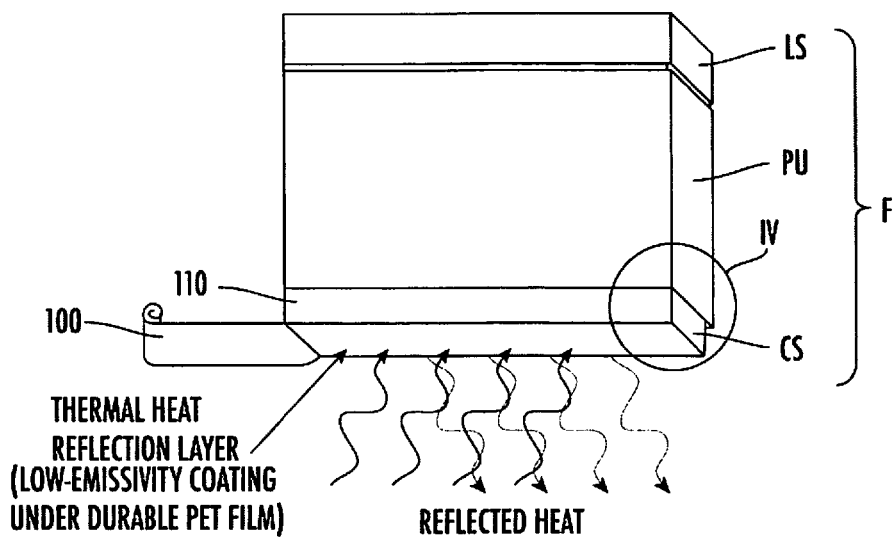
FIG. 3 is a side schematic view showing one embodiment of this invention with a new composite subfloor CS consisting of a thermal heat reflection-coating layer 100 under a durable PET film 110. Note how the arrows beneath this invention reflect the heat back down and away from the RV interior.
Figure 4:
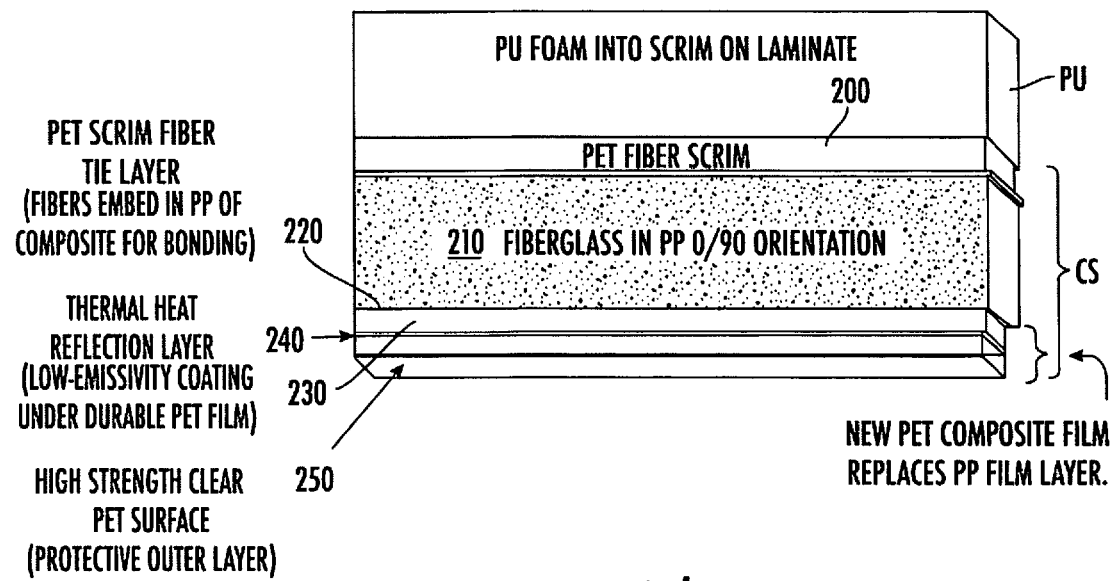
Figure 5B:
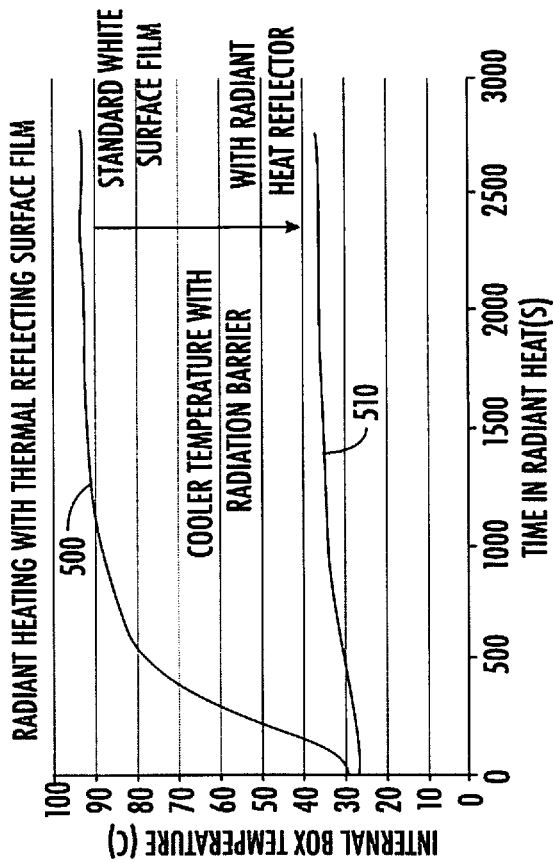
Figure 5A:
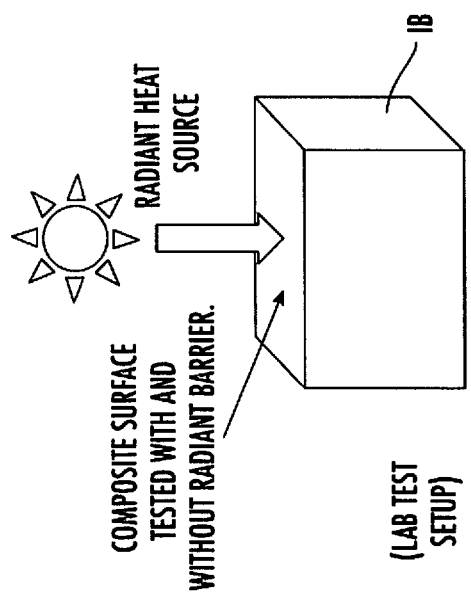

FIG. 4 is a close up, segmented view of the circled area IV in the lower right corner of FIG. 3 in which the various sub-layers to one embodiment are separately identified, namely: an uppermost polyurethane foam layer PU (into scrim on laminate) beneath which this invention adds a composite subfloor CS consisting of a PET fiber scrim 200 atop a layer of fiberglass in polypropylene 210, preferably in a 0/90 orientation. Beneath that would be a PET scrim fiber tie layer 220 having fibers embedded in the polypropylene of a composite for better bonding. Beneath PET scrim tie layer 220 would be a durable PET film layer 230 having a low emissivity coating/reflection layer 240 followed up by an underside of high strength, preferably clear PET serving as the bottom most protective outer layer 250;

FIG. 5A is a diagrammatic representation of a simulated laboratory set up for showing an insulated box IB without a radiant roof barrier layer as would be heated from above by the sun; and FIG. 5B is a graph depicting the expected heat saving improvements possible with the present invention when comparing temperatures for that lab test setup box IB over time for: just a standard white surface film (upper curve 500 of FIG. 5B); versus one with a radiant heat reflector incorporated therein (lower curve 510).

DETAILED DESCRIPTION OF THE INVENTION

This invention will replace standard sub-flooring materials of an RV with a vapor deposited, aluminum or aluminum-based metal coating onto a composite non-woven before a PET surface film is applied thereover to give the opacity and heat reflecting capability. The coating is only a few angstroms thick, so the weight of it can't even be measured. The metallization behind PET backing that will reduce the amount of reflective heat from the highway passing through that floor and into the RV proper from below; as well as reducing the amount of heat radiating downward from the sun, into and through the floors, roofs and sidewalls of slide outs for RV units.

Further advantages of this invention include measurably reducing thermal radiation from below for a PET film incorporated into the RV's flooring layers when adding pinhole-free PET films into the floors of new OR existing units.

Particular preferred product details include:
Providing a coated film product that is not significantly electrically conductive, so it would not be a potential source for galvanic corrosion.
The coating itself product would be fully insulated from exposure to surface air and contact parts by a film layer. If that film rubs off, the reflective coating would still be non-conductive.
One representative embodiment of this invention would be an aluminum coating about 50-200 Angstroms thick, more preferably about 100 Angstroms (or 0.00000001 m) thick. If the film fully or partially wears off for any reason, the coating will go with it.
A plastic film applied over this thermal reflective layer would be about 10,000 times thicker than the coating alone.
The backing fibers would include a fiber diameter of $30 \times 10^6$.
One single fiber would be about 3000 times larger than the coating alone.
0.0000027 grams/square meter (gsm) of reflective coating on 50 gsm composite film.

Referring now to FIGS. 3 and 4, there is seen one embodiment of improved RV floor construction or system per this invention. Generally speaking, it consists of a new composite subflooring with a thermal heat reflection coating layer 100 under a durable PET film 110.

FIG. 4 shows the sublayers making up this improvement in more detail. They consist essentially of an uppermost polyurethane foam layer PU (into scrim on laminate) beneath which this invention adds a composite subfloor consisting of a PET fiber scrim 200 atop a layer of fiberglass in polypropylene 210, preferably in a 0/90 orientation. Beneath that would be a PET scrim fiber tie layer 220 having fibers embedded in the polypropylene of a composite for better bonding. Beneath PET scrim tie layer 220 would be a durable PET film layer 230 having a low emissivity coating/reflection layer 240 followed up by an underside of high strength, preferably clear PET serving as the bottom most protective outer layer 250.

For the new polyester (preferably PET) Surface Film that replaces a PP Film, it should be noted that:
PET is higher temperature film. It will not melt in lamination.
PET is 100% closed film, i.e, it will have NO pinholes.
PET is a harder surface for better resisting scratches.
The thin, metallized heat-reflecting layer will be purposefully trapped beneath the aforementioned PET surface layer; and
The system includes a surface film bonded with composite fiber backing.

SEQUENCE LISTING

Not applicable.

Having described the best modes currently known for practicing this system and method, it is to be understood that the scope of this invention may be further described by the attached claims.

What is claimed is:

1. An RV sub-floor panel having a low emissivity, PET film layer incorporated into the sub-floor panel, said sub-floor panel consisting of the following layers: (a) a polyurethane foam into scrim or laminate; (b) a PET fiber scrim; (c) a fiberglass in polypropylene layer; (d) a vapor deposited, metal coating for heat reflection; and (e) a layer of durable PET film applied over the metal coating; and (f) a high-strength, PET outer surface layer.

2. The RV sub-floor panel of claim 1, which is a new construction.

3. The RV sub-floor panel of claim 1, which is a retrofitted construction.

4. The RV sub-floor panel of claim 1, which further includes: (g) a clear high-strength, PET outer surface layer wherein the fiberglass in polypropylene layer, element (c) above, has a 0/90 orientation of fibers.

5. The RV sub-floor panel of claim 1 wherein the vapor deposited, metal coating consists of aluminum, or an aluminum-based alloy.

6. The RV sub-floor panel of claim 1 wherein the vapor deposited, metal coating layer is about 100 angstroms thick.

7. The RV sub-floor panel of claim 1, which is a self-propelled RV unit.

8. The RV sub-floor panel of claim 1, which is a trailer pulled RV unit.

9. A slide out for an RV unit, said slide out having a low emissivity, PET film layer incorporated into at least one of the sub-floor panel, the sidewalls and the ceiling to said slide out, said sub-floor panel, sidewalls and ceiling consisting of the following layers: (a) a polyurethane foam into scrim or laminate; (b) a PET fiber scrim; (c) a fiberglass in polypropylene layer; (d) a vapor deposited, metal coating for heat reflection; and (e) a layer of durable PET film applied over the metal coating; and (f) a high-strength, PET outer surface layer.

10. The RV unit slide out of claim 9, which is a new construction.

11. The RV unit slide out of claim 9, which is a retrofitted construction.

12. The RV unit slide out of claim 9, which further includes: (g) a clear high-strength, PET outer surface layer wherein the fiberglass in polypropylene layer, element (c) above, has a 0/90 orientation of fibers.

13. The RV unit slide out of claim 9, wherein the vapor deposited, metal coating consists of aluminum, or an aluminum-based alloy.

14. The RV unit slide out of claim 9, wherein the vapor deposited, metal coating layer is about 100 angstroms thick.

15. A method for improving the heat reflectivity of an RV floor panel, said method comprising: (a) providing the RV floor panel with a low emissivity layer that includes a vapor deposited, metal coating layer and a durable PET film layer thereover.

16. The method of claim 15, which is practiced on a newly constructed RV floor panel.

17. The method of claim 15, which is practiced to retrofit a previously constructed RV floor panel construction.

18. The method of claim 15 wherein the vapor deposited, metal coating layer consists of aluminum or an aluminum-based alloy.

19. The method of claim 15 wherein the vapor deposited, metal coating layer is about 50 to 200 angstroms thick.

* * * * *